May 30, 1967   L. P. MELLYN   3,322,944
PORTABLE AUTOMOBILE SPOTLIGHT
Filed March 8, 1965   2 Sheets-Sheet 1
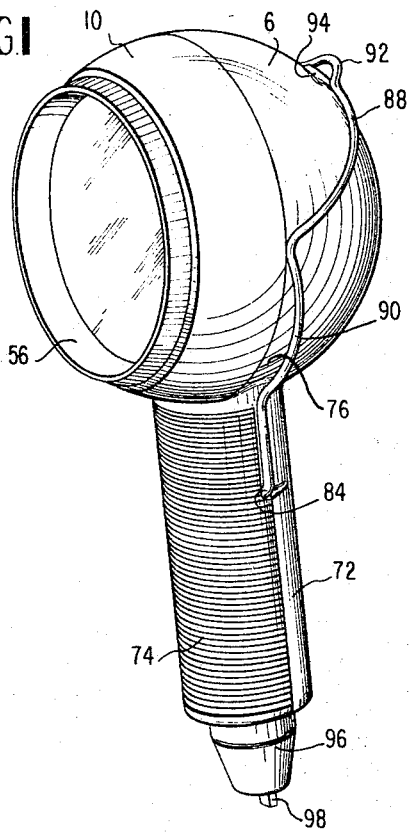
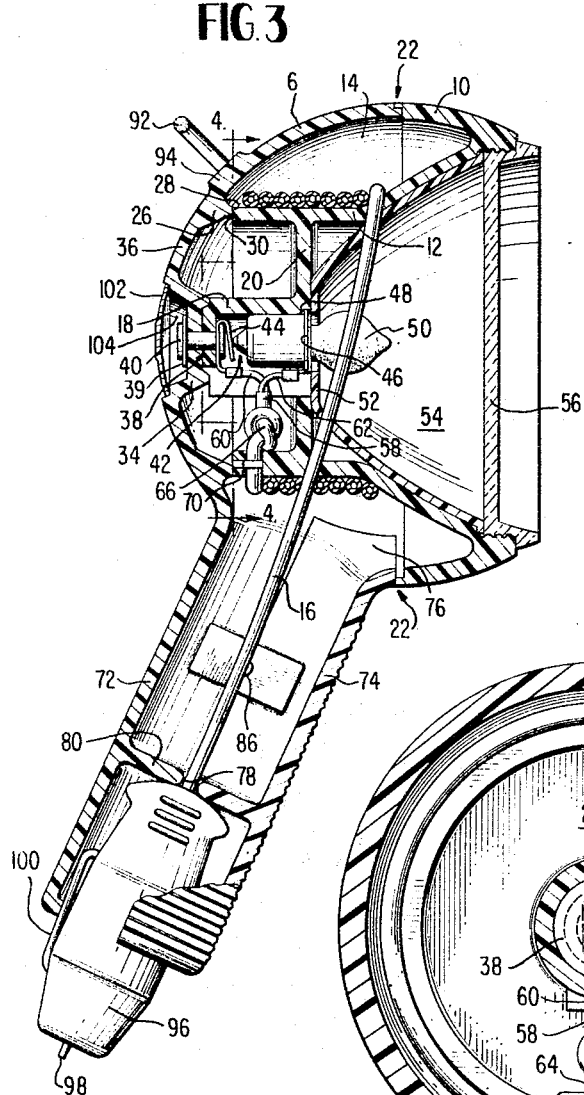
INVENTOR
LAWRENCE P. MELLYN
BY
ATTORNEY May 30, 1967  L. P. MELLYN  3,322,944
PORTABLE AUTOMOBILE SPOTLIGHT
Filed March 8, 1965  2 Sheets-Sheet 2
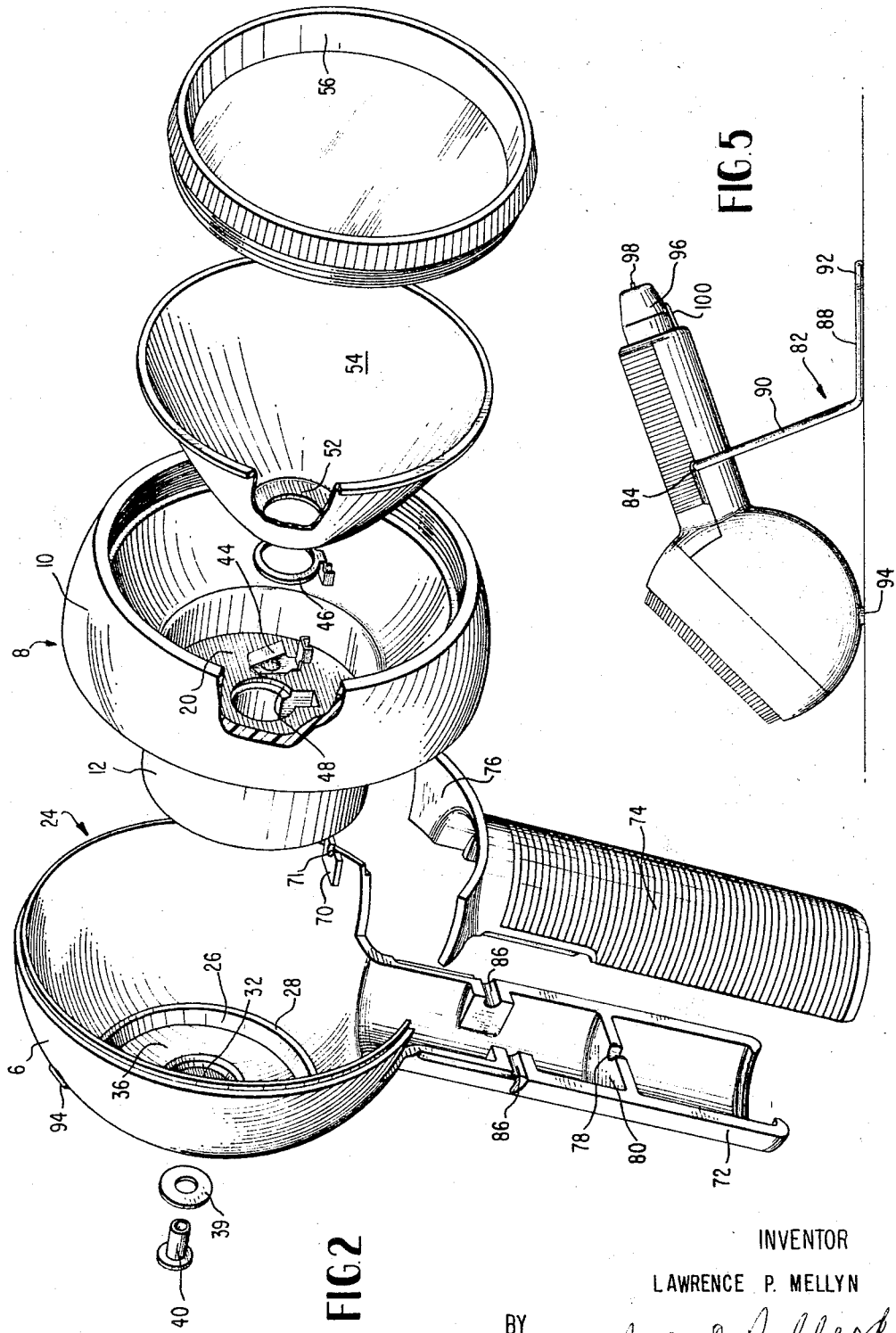
INVENTOR
LAWRENCE P. MELLYN
BY
Paul E. Rochford
ATTORNEY

United States Patent Office 3,322,944
Patented May 30, 1967

3,322,944
PORTABLE AUTOMOBILE SPOTLIGHT
Lawrence P. Mellyn, Chepachet, R.I., assignor to General Electric Company, a corporation of New York
Filed Mar. 8, 1965, Ser. No. 439,138
4 Claims. (Cl. 240—8.18)

My invention relates to automobile spotlights, and more particularly to spotlights of the portable variety which may be plugged into the dashboard socket for a cigarette lighter.

In the past portable automobile spotlights having provisions for storing cord have been either of two types. The first type incorporates a spring-loaded automatic cordwinder. This arrangement has the advantage that the cord rewinding operation is easy; however, these devices have been relatively expensive because of the sliding contacts used to deliver electrical energy to the lamp, and because of the reel mounting and spring-loading arrangements employed. In addition, these devices have been undesirably heavy and difficult to manipulate.

The second general type of portable automobile spotlights with cord storing means is the type in which the reflector and cord reel form a unit, the unit being removed from the housing when it is desired to transport the light source. With these lights the loose cord must be tediously wrapped by hand on the reel before reassemblying the unit within the spotlight housing. In addition to the disadvantage of having to wrap the cord upon the reel by hand, these spotlights have been additionally unsatisfactory in that the reflector is exposed and unprotected while the removable unit is being carried about.

Thus, the need for a compact, lightweight, and inexpensive portable spotlight having a provision for quickly and easily winding the cord upon a reel within the spotlight housing has presented itself.

Accordingly, it is an object of this invention to provide a compact, lightweight portable automobile spotlight having means for quickly and easily storing the cord within the spotlight housing.

It is another object of this invention to provide a portable automobile spotlight which is of extremely simple construction and which is inexpensive to produce.

It is still another object of this invention to provide a portable automobile spotlight having a novel provision for strain relief thereby precluding breakage of the electrical connections to the lamp.

It is a further object of this invention to provide a portable automobile spotlight having a rotatable cordwinder through which electrical energy is delivered without the need for brushes or other forms of sliding contacts.

Still further objects and advantages of this invention will become apparent as the following description proceeds. The subject matter which constitutes this invention will be pointed out with particularity in the claims annexed to and forming a part of this specification.

In carrying out the objects of this invention, in one form thereof, I provide a portable automobile spotlight comprising a hemispherical molded housing member serving as an external protective skeleton for the internal components of the spotlight and functioning additionally to rotatably mount and journal a molded cordwinder on the axis of the open forward end of the housing member. The cordwinder includes an external rim portion forming part of the housing for the spotlight, by which rim the cordwinder can be manually rotated. Three sets of cooperating bearing surfaces on the housing and cordwinder provide an inexpensive and highly stable journal for the cordwinder. A reel constituting part of the cordwinder at its forward end diverges outwardly to form a pocket which receives and protects a lamp reflector.

In operation, to withdraw the cord from the reel it is merely pulled from the end of the handle. To rewind the cord, the user need merely manually rotate the rim, thus winding the cord upon the reel into an annular chamber formed between the reel and the inner surface of the housing member.

For a better understanding of my invention, reference may be made to the accompanying drawings in which:

FIGURE 1 is a perspective view of the spotlight.

FIGURE 2 is an exploded view of the spotlight with portions broken away.

FIGURE 3 is a section view of the spotlight.

FIGURE 4 is a section view of the spotlight taken on lines 4—4 in FIGURE 3.

FIGURE 5 is a perspective view of the spotlight, showing a bail supporting the spotlight on a horizontal surface.

Referring to the drawings, and particularly FIGURES 1–3, it will be seen that I provide a portable automobile spotlight comprising a molded hemispherical housing member 6 serving as an external protective skeleton for the internal components of the spotlight. A molded cordwinder 8 is rotatably mounted within the housing member 6 and includes a forward portion forming part of the housing for the spotlight, this forward portion hereinafter being designated the rim 10. As shown in FIGURES 2 and 3, a reel 12 extends radially inwardly and rearwardly from the rim 10, forming together with the inner surfaces of the rim 10 and the housing member 6 an annular chamber 14 in which electrical supply cord 16 may be stored. A hollow molded hub 18 concentric with the reel 12 is integrally connected to said reel by a circular web 20.

In order to provide an extremely simple and inexpensive arrangement for rotatably mounting the cordwinder 8 within the housing member 6, three sets of mating bearing surfaces are provided between the housing member 6 and the cordwinder 8. The first, radially outermost set of mating bearing surfaces consist of a lap joint 22 where a circular forward edge 24 of the opening at the forward end of the housing member 6 mates with the rearmost edge of the rim 10. This lap joint 22 prevents radial movement and rearward axial movement of the cordwinder 8 with respect to the housing member 6.

The second set of mating bearing surfaces comprises an integral annular projection 26 from the inner surface of the housing member 6 having a surface 28 which mates with the rearmost edge surface 30 of the reel 12. This pair of mating bearing surfaces 28, 30 provides stability of rotation of the cordwinder 8, and serves, as does the lap joint 22, to prevent axial movement of the cordwinder 8 in the rearward direction.

The third set of mating bearing surfaces between the housing member 6 and the cordwinder 8 comprises a recessed area 32 in a forward protrusion 34 in the back wall 36 of the housing member 6 on the axis thereof. This recessed area 32 receives the end surface 38 of the hub 18, these surfaces 32, 38 giving even greater stability to the rotational motion of the cordwinder 8.

A rivet 40 through a washer 39 in the recessed area 32 on the axis of the housing member 6 and the cordwinder 8 serves as a means for rotatably mounting and securing the cordwinder 8 within the housing member 6. Thus, the user may rotate the cordwinder 8 by merely grasping the rim 10 and manually rotating it to wind the cord 16 upon the reel 12 into the annular chamber 14 between the reel 12 and the inner surfaces of the housing member 6 and the rim 10.

A unique arrangement is provided for supplying electrical power through the reel 12 without brushes or other sliding contacts to a lamp socket 42 within the hollow interior of the hub 18. A reverse bent center contact 44 is secured by the washer 39 and rivet 40 at the rear end of the socket 42. A radial contact 46 is disposed within a groove 48 at the forward end of the socket 42. The radial contact 46 and a lamp 50 are retained by a reflector 54 for the lamp 50. The reflector 54 is ensconced within the forward portion of the cordwinder 8, being held therein by a screw-in lens 56. It will be seen that as the lens 56 is turned down tightly upon the reflector 54, the radial contact 46 will be held securely in place and the lamp 50 will be retained in engagement with the radial contact 46 and the center contact 44.

It will be understood that with my arrangement for supplying electrical power to the lamp 50, no sliding contacts of the type usually employed are needed. As the reel 12 is rotated by manually turning the rim 10, the entire assembly consisting of the cordwinder 8, the reflector 54, lamp 50, the contacts 44, 46 and the lens 56 all revolve together. Thus, the need for sliding contacts to transmit electrical energy through the rotatable reel is eliminated.

The supply cord 16 has an end portion 58 within the reel with leads 60, 62 connected to the center contact 44 and radial contact 46, respectively. In order that the connection between these leads 60, 62, and the contacts 44, 46 may not be broken, a strain relief arrangement is provided. The strain relief comprises a first slot 64 in the rearmost edge of the reel 12 in a plane through the axis of the reel 12. This slot 64 receives the end portion 58 of the cord 16. The cord 16 is precluded from being drawn through the slot 64 by a knot 66 tied in the end portion 58 of the cord 16. In order that the cord 16 in the slot 64 won't be dislodged from the slot 64 and damaged, a second slot 68, transverse to the first slot 64, is provided (see particularly FIGURE 4). In this second slot 68 a fiber board retainer 70 is held. The retainer 70 has a notch 71 (see FIGURE 2) in a forward edge which loosely receives the cord 16. A highly effective strain relief is thus formed, the knot 66 in the end portion 58 of the cord 16 preventing the cord 16 from being withdrawn through the first slot 64, and the retainer 70 in the second slot 68 serving to hold the cord 16 securely in the first slot 64.

A canted first handle portion 72 is formed integrally with the hemispherical housing member 6. A second handle portion 74, mating with the first handle portion 72, has a section 76 which completes the circumference of the circular forward edge 24 of the housing member 6. The second handle portion 74 is retained on the first handle portion 72 by the rim 10 of the cordwinder 8. Notches (one being shown at 78) in halves of a septum 80 in the handle portions 72, 74 form an aperture which serves to guide the cord 16 to and from the reel 12 when the cord 16 is in motion.

A bail 82 serves to support the spotlight either pendulously from a projection above (see FIGURE 1) or, alternatively, in a tripod-type support on a horizontal surface (see FIGURE 5). The bail 82 has generally the shape of a loop with inwardly turned feet 84 which are received in a pair of diametrically opposed, radial openings 86 formed in the handle portions 72, 74. A first portion 88 of the bail 72 most remote from the feet 84 is bent from the plane of a second portion 90 of the loop.

When the bail is supporting the spotlight from above, the bail is clamped around the housing member 6, offering a loop 92 at the tip of the first portion 88 of the loop for receiving a hook or other projection upon which the lamp be hung in an upright position. In its alternative position, as shown in FIGURE 5, the bail is retracted from around the housing member 6 and is swung rearwardly to form a standard which the spotlight may be leaned back upon for support on a horizontal surface. A protuberance 94 formed integrally with the housing member 6 forms the third point in the essentially tripod support for the spotlight when it is supported upon a horizontal surface.

In order that the supply cord 16 may be plugged into an ordinary electrical supply socket for a cigarette lighter as commonly found on the dashboard of an automobile, a male receptor or plug 96 is provided, having the appropriate contacts 98, 100.

At the rear of the housing member 6, on the axis thereof, a circular indicia plate 102 hides the washer 39 and rivet 40 disposed in a recess 104 formed by the inward protrusion 34 in the housing member 6.

My invention is not limited to the particular details of construction of the embodiment illustrated and I contemplate that various and other modifications and applications will occur to those skilled in the art. It is therefore my intensions that the appended claims shall cover such modification and applications as do not depart from the true spirit and scope of my invention.

What I claim as new and desire to secure by Letters Patent of the United States is:

1. A portable automobile spotlight comprising:
 (a) a housing member having a forward edge defining a circular open forward end thereof,
 (b) a rotatably mounted cordwinder including:
   (1) an annular rim having a mating edge abutting said forward edge of said housing member, said edges forming bearing surfaces during rotation of said cordwinder, and
   (2) a reel disposed within said housing member coaxially with said circular open forward end thereof,
 (c) means rotatably mounting said cordwinder within said housing member,
 (d) a reflector ensconced within the forward end of said reel,
 (e) a lamp within said reflector, and
 (f) fixed electrical connections to the terminals of said lamp.

2. A portable automobile spotlight comprising:
 (a) a housing member having a forward edge defining a circular open forward end thereof,
 (b) a rotatably mounted cordwinder including:
   (1) an annular rim forming part of the housing for the spotlight, said rim having a rearmost edge abutting in overlapping relationship said forward edge of said housing member, said edges forming first bearing surfaces during rotation of said cordwinder,
   (2) a cylindrical reel disposed within said housing member coaxially with said circular open forward end thereof, said reel having a surface in engagement with an inner surface of said housing member, said surfaces forming second bearing surfaces during rotation of said cordwinder, whereby the outer surface of said reel and an inner surface of said housing member form an annular chamber for receiving cord wound on said reel,
 (c) means for rotatably mounting said cordwinder in said housing member,
 (d) a reflector ensconced within the forward end of said reel,
 (e) a lamp within said reflector, and
 (f) fixed electrical connections to the terminals of said lamp.

3. A portable automobile spotlight comprising:
 (a) a hemispherical molded housing member having a forward edge defining a circular open forward end thereof, said housing member including an annular projection from the inner surface of said housing member coaxial with the axis of said circular open forward end thereof,
 (b) a rotatably mounted, molded cordwinder including:
   (1) an annular rim forming part of the housing for the spotlight, said rim having a rearmost edge abutting said forward edge of said housing member, said edges forming first bearing surfaces during rotation of said cordwinder.
   (2) a cylindrical reel extending rearwardly into said housing member from said rim coaxially with said circular open forward end thereof, said reel having a rearmost edge surface abutting said annular projection, said rearmost edge surface of said reel and the surface of said annular projection forming second bearing surfaces during rotation of said cordwinder, whereby the outer surface of said reel and the inner surface of said housing member form an annular compartment for receiving cord wound on said reel,
   (3) a hub extending axially rearwardly from said reel into engagement with a recessed area on the inner surface of said housing, the rearmost surface of said hub and said recessed area forming third bearing surfaces during rotation of said cordwinder,
(c) a rivet through said recessed area and said hub on the axis of said open end of said housing member for rotatably mounting said cordwinder within said housing,
(d) a hollow handle integral with said housing member, said handle receiving and guiding cord to and from said reel,
(e) a reflector ensconced within the forward end of said reel,
(f) a lamp within said reflector, and
(g) fixed electrical connections to the terminals of said lamp.
4. A portable automobile spotlight comprising:
(a) a housing member having a forward edge defining a circular open forward end thereof,
(b) a rotatably mounted, molded, cordwinder including:
   (1) an annular rim forming part of the housing for the spotlight, said rim having a rearmost edge abutting said forward edge of said housing member, said edges forming first bearing surfaces during rotation of said cordwinder,
   (2) a cylindrical reel disposed within said housing member coaxially with said circular open forward end thereof, said reel having a rearmost edge surface in engagement with an inner surface of said housing member, said surfaces forming second bearing surfaces during rotation of said cordwinder, whereby the outer surface of said reel and the inner surface of said housing member form an annular chamber for receiving cord wound on said reel,
   (3) a strain relief arrangement comprising:
      (aa) a first slot formed in said reel for receiving electrical supply cord, said first slot being formed in a plane through the axis of said reel and opening on the rearmost edge surface of said reel,
      (bb) a second slot formed in said reel through said slot transverse to said first slot, said second slot also opening on said rearmost edge surface of said reel,
      (cc) a retainer slidably received in said second slot, said retainer having a notch which receives the electrical supply cord, said strain relief arrangement precluding passage outward through said reel of a knot tied in said cord within said reel,
(c) means for rotatably mounting said cordwinder within said housing,
(d) a reflector ensconced within the forward end of said reel,
(e) a lamp within said reflector, and
(f) fixed electrical connections to the terminals of said lamp.

References Cited

UNITED STATES PATENTS

| | | | |
|---|---|---|---|
| 1,656,648 | 1/1928 | Ritz woller | 240—8.18 |
| 2,403,892 | 7/1946 | McFarlane et al. | |
| 2,507,541 | 5/1950 | Patterson | 240—8.18 |
| 2,570,329 | 10/1951 | Dunkelberger | 240—54.2 X |
| 2,784,305 | 3/1957 | Lawson et al. | 240—8.18 |
| 3,103,134 | 9/1963 | Heisler | 240—1.3 |
| 3,177,358 | 4/1965 | Suttie | 240—54.2 X |

NORTON ANSHER, *Primary Examiner.*